(12) United States Patent
Vinokurov et al.

(10) Patent No.: US 8,438,582 B2
(45) Date of Patent: May 7, 2013

(54) SOFT DENIAL OF APPLICATION ACTIONS OVER THE NETWORK COMMUNICATIONS

(75) Inventors: Dmitri Vinokurov, Ottawa (CA); Faud Ahmad Khan, Osgood (CA)

(73) Assignee: Alcatel Lucent, Paris (FR)

( * ) Notice: Subject to any disclaimer, the term of this patent is extended or adjusted under 35 U.S.C. 154(b) by 1346 days.

(21) Appl. No.: 12/165,150

(22) Filed: Jun. 30, 2008

(65) Prior Publication Data
US 2009/0328071 A1    Dec. 31, 2009

(51) Int. Cl.
*G06F 3/00* (2006.01)
(52) U.S. Cl.
USPC .......................................... 719/328; 719/330
(58) Field of Classification Search ............... 719/328, 719/310; 709/203
See application file for complete search history.

(56) References Cited

U.S. PATENT DOCUMENTS

| | | | |
|---|---|---|---|
| 3,992,696 A * | 11/1976 | Fergeson | 714/805 |
| 5,689,708 A | 11/1997 | Regnier et al. | |
| 7,440,458 B2 * | 10/2008 | Wrenn et al. | 370/394 |
| 7,895,311 B1 * | 2/2011 | Juenger | 709/223 |
| 8,010,793 B2 * | 8/2011 | Hoshino et al. | 713/168 |
| 2004/0098485 A1 * | 5/2004 | Larson et al. | 709/227 |
| 2004/0205190 A1 | 10/2004 | Chong et al. | |
| 2004/0205692 A1 * | 10/2004 | Robinson | 717/100 |
| 2004/0254843 A1 * | 12/2004 | Koch | 705/26 |
| 2006/0153073 A1 | 7/2006 | Ghiware et al. | |
| 2006/0155643 A1 * | 7/2006 | Shuman et al. | 705/40 |
| 2007/0033264 A1 * | 2/2007 | Edge et al. | 709/217 |
| 2007/0168578 A1 * | 7/2007 | Balchandran et al. | 710/18 |
| 2008/0086700 A1 * | 4/2008 | Rodriguez et al. | 715/804 |

OTHER PUBLICATIONS

Stefan, Socket++: A Uniform Application Programming Interface for Basic-Level Communicatin Services, 1996.*

* cited by examiner

*Primary Examiner* — Lechi Truong
(74) *Attorney, Agent, or Firm* — Kramer & Amado P.C.

(57) ABSTRACT

A soft-denial system for client-server networks is disclosed for translating server authorization denials into responses that are known to be innocuous to the client application. The soft-denial system includes a client-application which originates a service request across a network to a server-application which rejects the request due to lack of authorization and subsequently provides a denial response. A soft-denial application intercepts the denial response, translates the response into a response known to be innocuous to the client-application, and forwards the innocuous response to the client-application. The soft-denial system is particularly useful for overcoming client-application failures due to authorization expectation mismatches.

11 Claims, 2 Drawing Sheets

Figure 1a   PRIOR

SOFT DENIAL OF APPLICATION ACTIONS OVER THE NETWORK COMMUNICATIONS

FIELD OF THE INVENTION

The invention relates to communication protocols and is particularly concerned with a soft-denial mode of inter-application communications.

BACKGROUND OF THE INVENTION

As described in U.S. Pat. No. 5,689,708; in historical mainframe computer systems, a single central processor complex running under an operating system would execute application programs, stores databases, enforce security, and allocates all resources such as processor time, memory usage, and subsystem processing. Users would interact with the system via "dumb" terminals, which essentially only display data and receive keystrokes.

Evolution of networking connectivity and processor availability led to peer-to-peer networks of systems such as personal computers which are essentially standalone computers each running similar operating system programs, which can share application programs and data among each other according to a defined protocol.

Yet another form of computing deployment is that of client/server networks which have a central server computer coupled via a communications medium to a number of client computers, usually smaller personal computers running under a conventional operating system. In the earliest client/server network model, the server was only a "file server" which could download data to the clients and upload data from them; application programs were executed entirely in the client computers.

Most present client/server networks implement a more sophisticated "application server" model in which some or all application programs are split into two portions. A server portion executes within the server computer, while a separate client portion executes within each client computer from which a user can invoke the application. The two portions employ cooperative processing to pass data between the server and client computers; typically, most of the data is stored in the server. The first major application of this model was the processing of client queries against a central database, so that this model is also sometimes known as a "database server" network.

A key operational aspect which must be handed in such networks involves establishing authorization for access to data and services on the server by a given client. Authorization/permission control frameworks and relationships may be complex. Actions assigned to or requested by different components of such framework can be configured independently and separately by different entities: end user, application, AAA (Authentication, authorization and accounting) server, database, application server, firewall, network administrator, and other like network resource equipment.

At the time of actual performing of its actions, a given user's application (client-application) may communicate with another "application-aware" network entity which controls the permissions assigned to this application or user. This network entity could be some kind of Configuration server, Kerberos-like server, SBC (Session Border Controller), firewall, database, IPS (Intrusion Prevention System), Proxy server, or similar resource providing entity. This inter-application communication will operate using some form of communication protocol, API or other means.

The client-application, however, will also have its own independently defined settings which describe the actions this application is assumed (or expected by the user) to perform, i.e. things it is configured to do. At the time of execution these "local" settings may conflict with those permissions set by server-application. As a result of this, the client-application's request/action will not have permissions or authorization to be executed on (or approved by) the external entity. This results in the request/action denial by that external entity.

Denial of action may take various forms:
1. Rejection at application level and by the server application means
    1.1 A "not authorized" application response—once extra credentials have been explicitly asked and (re)submitted
    1.2 A "cancellation" of the transaction
    1.3 A "bad/unrecognized request" type of application response
    1.4 A redirection/forwarding to another external entity by means of the server application
    1.5 An inducement of an error state or other security condition on the server side (external entity)
2. A client-to-server connection tear-down at the network Transport layer
3. A total lack of response
4. A partial provisioning—i.e. providing some minimal authorization/resources/access—yet not such as requested/expected/needed by the client application.

In general the settings' conflict may not be detected until the action is actually executed by application and the request for which insufficient authorization exists is communicated to the server. Moreover, and importantly, sometimes denial of action/request is unexpected by the client application in terms of software implementation (such as exceptions handling) or application logic. Given the variety of ways to deny the requested action (listed above), an unexpected denial may lead the application at the "client" side to enter into an unexpected state, for example that of termination, reboot, an infinite loop, crash, or freeze while waiting for further response. While application designers endeavor to anticipate and minimize such responses, the nature of software design does not render it inevitable that all such interactions are anticipated.

This is particularly evident in the live deployments of multi-user client applications, for example call centers, with the client application configurations periodically undergoing change by users/consumers, wherein there is no realistic way to make a "dry run" on all possible mismatch situations during configuration, deployment, or development/testing phases. Further, even if the client application is properly configured for a given server configuration, the permission settings on the server (network entity) are also subject to change due independent of the client application, which could potentially leads to a critical (for the client application) mismatch again.

Therefore, it would be desirable to obtain a networking implementation wherein authorization denials would be less likely to result in client-applications failing in an undesirable manner.

SUMMARY OF THE INVENTION

It is an object of the invention to provide improved request denial system for client-server applications running across a network.

According to an aspect of the invention there is provided a system for providing soft-denial of client-application requests over a network supporting client-server interactions between network entities. In the disclosed system there may be found a client-application; a server-application; and a network connecting the client-application to the server-application. A request originating from the client-application is communicated across the network to the server-application. In the case that the server-application determines that the client-application does not have sufficient authorization to allow the request to be satisfied; the server-application produces a denial message to be communicated across the network to the client-application. There may also be found within the system a soft-denial application which intercepts the denial message and replaces the message with an innocuous message which is communicated to said client-application in the place of the denial message.

In some embodiments of the invention the network is a telecommunications network.

Advantageously, in telecommunications networks, the client-server interactions support Voice-over-IP services.

In a particular embodiment the innocuous message results in an aborting of the request processing by the initiative, under control and at the client-application while preserving a protocol stack connecting the client-application to the network.

According to another aspect of the invention there is provided a method for providing soft-denial of client-application actions over a network supporting client-server interactions between network entities. The method includes the steps of receiving an original action request from a client-application directed to another network entity; determining that said request should be denied due to insufficient authorization; providing a denial response for the client-application; translating the denial response into an innocuous response; and forwarding the innocuous response to the client-application.

Some embodiments of the invention include having the innocuous response comprising not forwarding the denial response, thereby resulting in a time-out condition by the client-application.

Advantageously, in some embodiments of the invention the innocuous response results in an aborting of the request processing at the client-application side while preserving the protocol stack connecting the client-application to the network.

A more complete understanding of the present invention, as well as further features and advantages of the invention, will be apparent from the following detailed description and the accompanying drawings.

BRIEF DESCRIPTION OF THE DRAWINGS

The present invention will be further understood from the following detailed description of embodiments of the invention, with reference to the drawings in which:

FIGS. 1a and 1b illustrate a client-server networking system in accordance with the prior art.

DETAILED DESCRIPTION

Figure 1B:
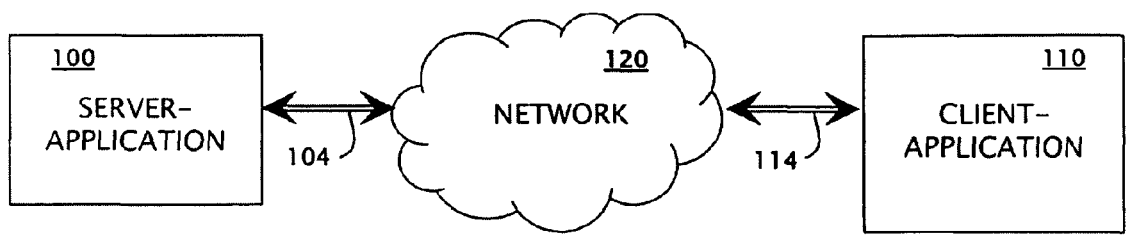
Figure 1B:
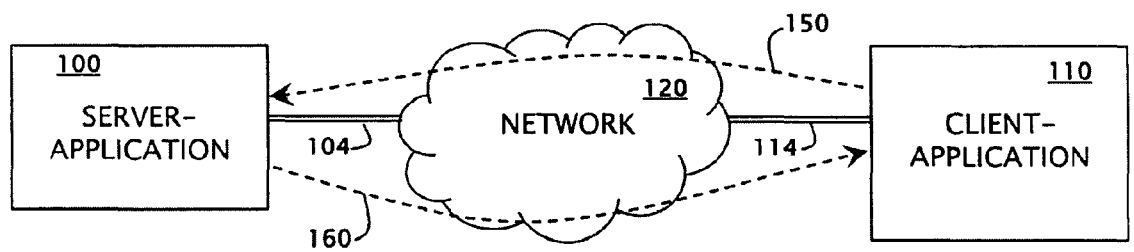

Referring to FIG. 1a, there may be seen a structural block diagram of a client-server network according to the prior art wherein the client-application 110 is in communication with a server-application 100 over network 120. The client-application connects through appropriate protocols 114 to the network 120, and likewise the server-application 100 connections through appropriate protocols 104 to the network 120.

Referring to FIG. 1b, there may be seen an exchange of messages between the client-application 110 and server-application 100 over the client-server network of FIG. 1a. A client-application request 150 is communicated across the network 120 to server-application 100. In result of request 150, server-application 100 provides a response 160 which is communicated across the network 120 to the client-application 110.

On the occasion that server-application 100 does not recognize client-application 110 as having the authority to obtain the requested action (resource, access, service, or other provision), response 160 will be some form of denial response. In the case that client-application 110 is not expecting a denial response, the subsequent actions of client-application 110 are not determined and may result in compromised operation.

Figure 2:
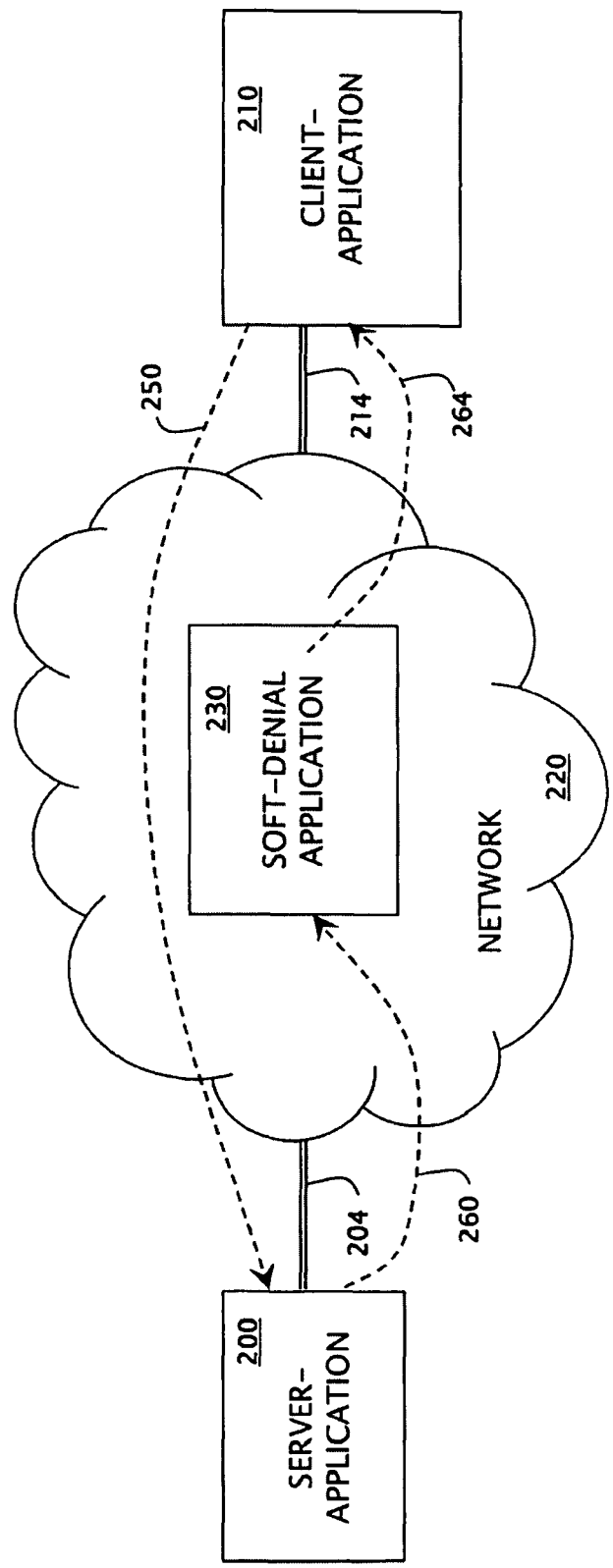
FIG. 2 illustrates a client-server networking system in accordance with an embodiment of the present invention.

Referring now to FIG. 2, there may be seen a diagram of a client-server network according to an embodiment of the invention. Client-application 210 is connected via protocol 214 to network 220, and likewise server-application 200 is connected to network 220 via protocol 204. Client-application request 250 is communicated across network 220 to server-application 200, and server-application 200 provides response 260 in answer to request 250. A new element, soft-denial application 230, monitors response 260, and in the case where response 260 constitutes a denial, soft-denial application 230 translates the denial into a soft-denial 264.

In the network, soft-denial application 230 can be implemented within either the originator of the denial i.e. server-application 200, or by a protocol-aware mediator in the network between the client-application 210 and server-application 200, such as firewall, proxy, SBC, IPS, or similar entity or application.

It is important to notice that resolving the denial via requesting or re-requesting authentication credentials is not a useful option here. This is because the original problem occurs due to an authorization (allowed action configuration) mismatch, even though the identity (authentication) was already successfully verified. The mismatch is not one of identity, but instead one of expectations between what client-application 210 considers as a normal operational request, and what the server-application 200 deems as an unauthorized request.

According to one contemplated embodiment, the mode is implemented at the communication protocol level. Safety for the client is achieved by modifying the rejecting response so that:

the response looks syntactically and semantically as a neutral or acknowledgement type of message, so that the protocol stack and application logic and processing at the client side is not affected;

the response may suspend the client application from further processing;

at the same time, processing of the request at the server side is aborted.

Several alternative versions of soft-denial messages may be employed to meet and implement three requirements above.

According to one embodiment, the soft-denial may be effected by assigning a known to be non-existing message type (i.e. unknown, not valid in the protocol concerned) to the rejection/denial application response. The use of this message type is appropriate for applications where it is known that the client-application has a graceful response to unknown message types. The reception of this unknown message type forces the client-application to halt/suspend the process execution, and terminate later on under its own initiative and control. Such assignment/modification can be done either by the rejection originating server-application 200 or by the intermediate protocol-aware network entity, soft-denial application 230.

According to another embodiment, the soft denial may be implemented at the protocol headers/fields semantics level wherein the "soft-denial" response message presents formal acknowledgement of the action/request accepting, as if no authorization mismatch was found. However, in addition, the response will possess a new embedded informational metadata piece/string in the payload which is effectively a conventional sign for the client-application 210. This string indicates "not authorized/settings mismatch". This gives to the protocol stack and to other parts of the client-application 210 (those parts that are not authorization-aware, but just executing with the expectation that authorization is adequate) the impression that everything is operating as expected and nothing is suddenly broken. The client-application 210 may or may not be modified to understand this sign in order to stop action execution. In the latter case where the client-application 210 is not modified, the client-application 210 may ignore the sign or reject the whole message which would bring us to the first option above.

According to a third embodiment, the soft-denial may be implemented by blocking the rejection response from arriving at the client-application 210. For the client-application 210 it will appear as-if the server-application 200 is ignoring the request 250. This may result in a repeat of the request but will ultimately enforce termination by time-out on the client-application 210 as soft-denial application 230 continues to block the denial messages from server-application 200.

A common characteristic of soft-denial responses is that to the client-application they are innocuous responses.

A specific application of the soft-denial application is in a VoIP (Voice over IP) system providing call service across a network. In a VoIP system implemented over SIP (Session Initiation Protocol) via SBC (Server Based Computing) it is possible to actively intervene with the communication protocols; for instance, SIP B2BUA (Session Initiation Protocol Back-to-Back User Agent) terminates and originates SIP dialogs, and in doing so it can generate new messages or alternate the existing ones.

Being SIP-aware, an SBC system can implement soft-denial application 230 via monitoring UAS (User Agent Server) "rejecting" denial response messages. By way of example, denial messages such as "488 Not Acceptable Here", "503 Service Unavailable", "603 Decline", "606 Not Acceptable", and also those denial messages within SIP NOTIFY message body. In this embodiment of the invention, the soft-denial application 230 can translate them to a SIP "ACK_Not_Configured_To" message. An example of an instance wherein a denial message might arise in a VoIP system is where the client-application 210 phone agent's attempt to forward the call or to get a third party to join the call is not authorized by the policy set on the other server-application 200 side.

According to another application, protocol-aware firewalls are widely used within enterprise networks. They may have embedded ALG (application level gateways) and inspect/monitor packets of VoIP signaling, FTP, HTTP and others at Layer 7. Utilizing a soft-denial application 230, a firewall can block "rejecting" response messages of the concerned protocol, thus eventually enforcing timeout on the client-application 210.

According to yet another application of the invention, in many client-server application environments operation system environment files are accessed by applications via Operating System function calls, and access permissions are controlled by Operating System and file properties. If an particular application requests a read-access to read from a file, and the Operating System does not consider the application as authorized to access that file, the Operating System provides an authorization error in return. Should the application may not be expecting an authorization error and should no correct exception handling be prepared, problematic results may ensue. With OS kernel patched with the soft-denial application 230, the authorization error response could be translated instead to an "end_of_file" which the application would interpret as an empty file, a response which could be gracefully handled. The same response can apply to network communication over FTP.

Large enterprise networks with interconnected sites, services and endpoints are contemplated as the most apparent place for implementation of the presented concept as SBCs (Server Based Computing systems), firewalls, SIP (Session Initiation Protocol) servers, proxies, databases, IPSs (Intrusion Prevention Systems) are commonly found to be deployed within or at the perimeter of enterprise networks.

The presence of a soft-denial application is safer for end user applications, in particular for those configured independently of the server-application and especially those configured by end user's discretion.

The soft-denial application can be fruitfully employed to enable a "network trial/debug" mode for starting up new network deployments, applications, or distributed configurations. Of particular use in this context would be an enabling/disabling mechanism for the soft-denial application, wherein during times of reconfiguration and change the soft-denial application could be engaged as a form of safety net, and once confidence was established, the soft-denial application could be disabled to reduce the network processing overhead.

Numerous modifications, variations and adaptations may be made to the embodiments of the invention described above without departing from the scope of the invention, which is defined in the claims here below appended.

What is claimed is:

1. A system for providing soft-denial of client-application requests over a network supporting client-server interactions between network entities, said system comprising:
a server computer configured to communicate with a client computer via the network, wherein the network is configured to connect the client computer to said server computer;
a request originating from said client computer and received by said server computer from the network;
wherein said server computer is configured to determine that said client computer has insufficient authorization to allow said request to be satisfied, and, in response to said insufficient authorization, produce a denial message to be communicated across said network to said client computer; and
a soft-denial element configured to intercept said denial message and replace said denial message with an innocuous message having a non-existing message type which is communicated to said client computer in lieu of said denial message;
wherein said network is a direct Application Programming Interface (API) between applications.

2. A system as claimed in claim 1, wherein said network is a telecommunications network.

3. A system as claimed in claim 2, wherein said client-server interactions support Voice over Internet Protocol (VoIP) services.

4. A system as claimed in claim 1, wherein said innocuous message results in an aborting of the request processing at said client computer while preserving a protocol stack connecting said client computer to said network.

5. A system as claimed in claim 1, further comprising:
an enabling/disabling mechanism for activating and deactivating said soft-denial application.

6. A method for providing soft-denial of client-application actions over a network supporting client-server interactions between network entities, said method comprising:
receiving an original action request from a client computer directed to another network entity;
determining that said request should be denied due to insufficient authorization;
providing a denial response for the client computer;
translating said denial response into an innocuous response having a non-existing-message type in a server-application; and
forwarding said innocuous response to the client computer,
wherein said network is a direct Application Programming Interface (API) between applications.

7. The method of claim 6, wherein said innocuous response results in an aborting of the request processing at the client computer while preserving a protocol stack connecting said client computer to said network.

8. The method of claim 6, wherein said innocuous response comprises not forwarding said denial response, thereby resulting in a time-out condition by said client computer.

9. A non-transitory medium having computer-executable instructions for performing a method for providing soft-denial of client computer actions over a network supporting client-server interactions between network entities, said non-transitory medium comprising:
instructions for receiving an original action request from a client computer directed to another network entity;
instructions for deter-mining that said request should be denied due to insufficient authorization;
instructions for providing a denial response for the client computer;
instructions for translating said denial response into an innocuous response having a non-existing message type in a server-application; and
instructions for forwarding said innocuous response to the client computer;
wherein said network is a direct Application Programming Interface (API) between applications.

10. The non-transitory medium of claim 9, wherein said innocuous response results in an aborting of the request processing at the client computer while preserving a protocol stack connecting said client computer to said network.

11. The non-transitory medium of claim 9, wherein said innocuous response comprises not forwarding said denial response, thereby resulting in a time-out condition by said client computer.

* * * * *